United States Patent [19]

Wintraecken et al.

[11] Patent Number: 5,310,864
[45] Date of Patent: May 10, 1994

[54] GLYCIDYL ESTER/IMIDAZOLE ADDUCT-CONTAINING COMPOSITION

[75] Inventors: Johannes J. M. H. Wintraecken; Antonius J. M. Zwijnenberg; Virgilius C. J. N. Van Liempd, all of Amsterdam, Netherlands

[73] Assignee: Shell Oil Company, Houston, Tex.

[21] Appl. No.: 984,173

[22] Filed: Nov. 20, 1992

[30] Foreign Application Priority Data

Nov. 22, 1991 [EP] European Pat. Off. ........ 91203069.9

[51] Int. Cl.$^5$ ...................... C08G 59/68; C08G 65/10; C07D 233/54
[52] U.S. Cl. ....................................... 528/361; 528/94; 528/117; 528/341; 548/341.5; 548/335.1
[58] Field of Search .................. 548/341; 528/94, 117, 528/341, 361

[56] References Cited

U.S. PATENT DOCUMENTS

| | | | |
|---|---|---|---|
| 3,756,984 | 9/1973 | Klaren et al. | 528/94 |
| 4,358,571 | 11/1982 | Kaufman et al. | 528/94 |
| 5,001,212 | 3/1991 | Hammer et al. | 528/94 |

*Primary Examiner*—Frederick Krass

[57] ABSTRACT

An adduct of a glycidyl ester of an alpha,alpha-branched saturated monocarboxylic acid containing a total of 5 to 18 carbon atoms and 2-isopropylimidazole can be used to cure epoxy resin compositions useful in preparing prepregs for electrical laminates.

2 Claims, No Drawings

GLYCIDYL ESTER/IMIDAZOLE ADDUCT-CONTAINING COMPOSITION

BACKGROUND OF THE INVENTION

This invention relates to glycidyl esters of alpha,alpha-branched saturated monocarboxylic acids containing a total of 5 to 18 carbon atoms.

Imidazole compounds having a secondary amino group in the ring and salts or adducts thereof have been proposed as accelerator; for epoxy resin/curing agent systems. U.S. Pat. No. 3,756,984 relates to the preparation of a whole range of adducts of mono- and polyepoxides with imidazoles having a secondary amino group in the ring and to the use of such compounds as curing agents, alone or in combination with other curing agents in epoxy resin compositions, particularly in molding powders or powder coating compositions. These described epoxy-imidazole adducts are in general good curing agents and accelerators for the anhydride curing of polyepoxides.

However, in certain epoxy resin systems, such as epoxy resin solventless prepreg matrix systems for fiber-reinforced composites, not any type of epoxy-imidazole adduct can be used effectively as a curing agent or accelerator. Such systems require an accelerator which is liquid at room temperature and which is effective in an amount of 0.75% and 10% by weight based on the total weight of the epoxy resin composition, in order to minimize plasticizing effects. Also in such applications, the epoxy resin/curing agent/accelerator system should have a long shelf life, good reactivity at elevated temperature and high glass transition temperature.

It is therefore an object of the invention to provide an epoxy resin-based composition which is useful in solventless prepreg applications.

SUMMARY OF THE INVENTION

According to the invention, a composition is provided comprising an adduct of (a) a glycidyl ester of an alpha,alpha-branched saturated monocarboxylic acid containing a total of 5 to 18 carbon atoms and (b) 2-isopropylimidazole. The adducts can be used as a cure accelerator for epoxy resin compositions having a combination of good storage stability, high cured Tg, and good reactivity.

DETAILED DESCRIPTION OF THE INVENTION

The glycidyl esters in the invention may be any of the glycidyl esters of the alpha,alpha-branched saturated monocarboxylic acids having a total of 5 to 18 carbon atoms, or a mixture thereof. Preferably the glycidyl ester used is a mixture of glycidyl esters of alpha,alpha-branched saturated monocarboxylic acids having a total of 9 to 18 carbon atoms the main constituents of which are the glycidyl esters of alpha,alpha-branched saturated monocarboxylic acids having a total of from 9, 10 or 11 carbon atoms, known as CARDURA ® E10.

The adducts can be prepared by mixing the glycidyl ester and the imidazole compound in a molar ratio within the range of 0.5 to 2.0, at a temperature within the range of room temperature to 150° C., preferably 100° to 150° C., for a period of time which may vary, depending on the temperature, from 0.1 hours to 24 hours, preferably from 1 to 5 hours.

The adduct so obtained can be used in epoxy resin compositions alone or in combination with a co-curing compound. The epoxy resin composition will suitably comprise 0.05 to 20 parts by weight (pbw), preferably 0.5 to 10 pbw, of the adduct of the invention per 100 pbw of the epoxy resin plus co-curing compound (if present).

The epoxy resins to be used in the epoxy resin composition of the invention are in general those compounds having on average more than one epoxy group per molecule. The number of epoxy groups per molecule is obtained by dividing the average molecular weight of the epoxy resin by its epoxide equivalent weight (EEW). Preferred epoxy resins are glycidyl ethers of polyhydric phenols including diphenylol alkanes such as 2,2-bis(4-hydroxyphenyl)propane (bisphenol-A or BPA), 1,1-bis(4-hydroxyphenyl)ethane, and bis(4-hydroxy-phenyl)methane, 4,4'-dihydroxydiphenyl sulphone, hydroquinone, resorcinol, dihydroxydiphenyl, dihydroxy naphthalenes and polyhydric phenols such as novolacs and resols prepared by condensation of phenol or cresols with formaldehyde. Other epoxy resins are glycidyl ethers of halogenated mono, di- or polynuclear phenols such as for example EPIKOTE ® 1047 or EPIKOTE ® 1141; glycidated amines, aminophenols and amides; glycidated polyacids; and epoxy cyclohexyl and cyclopentyl compounds.

Mixtures of polyepoxides as described above and mixtures with monoepoxides may also be used. The choice of epoxy resin(s) depends on the final application of the epoxy resin composition of the invention.

Particularly preferred epoxy resins are the polyglycidyl ethers of BPA having an EEW of from 140 to 400, such as EPIKOTE ® 828, a liquid bisphenol A-based epoxy resin having an EEW of from 182 to 194.

The epoxy resin compositions of the invention may further contain a co-curing compound. Suitable co-curing compounds are phenols, mercaptans, polycarboxylic acids and their anhydrides, phosphines, amino compounds, amine salts and quaternary ammonium salts.

Examples of suitable amines which can be used in combination with the adduct of the invention are aliphatic monoamines such as dimethyl ethanolamine, methyl diethanolamine, morpholine, stearyl dimethylamine, tri-n-hexylamine; aliphatic polyfunctional amino compounds such as ethylene diamine, diethylene triamine, N,N-dimethyl aminopropylamine, dicyandiamide, guanidine, and amidines; cycloaliphatic amines such as di(4-aminocyclohexyl)methane, di(3-methyl-4-aminocyclohexyl)methane, and 1-amino-3-aminomethyl-3,5,5-trimethyl cyclohexane (isophoronediamine); aromatic primary and secondary amines such as p,p'-bis-(aminophenyl)methane, p,p'-bis(aminophenyl)sulphone, m-phenylene diamine, diethylene diaminetoluene; ortho alkylated primary aromatic amines such as 4,4'-methylenebis(2,6-diethyl aniline), and 4,4'-methylenebis(2,6-diisopropyl aniline).

Polycarboxylic acid anhydrides which can be used in combination with the adduct of the invention are phthalic anhydride, tetrahydrophthalic anhydride and its alkylated compounds, hexahydrophthalic anhydride and its alkylated compounds, succinic anhydride and trimellitic anhydride.

Preferred co-curing compounds are dicyandiamide and orthotoluene biguanidine. The concuring compounds are generally employed in amounts varying according to the nature and the equivalent weights of concuring agent and epoxy resin present in the epoxy resin composition of the invention. Polycarboxylic acid anhydrides are preferably used in a ratio higher than 0.8, usually between 1.0 and 2.3 acid equivalents per epoxide equivalent. Amino compounds having more than one hydrogen atom attached to nitrogen are preferably used in a ratio of from 0.8 to 1.2 active hydrogen equivalents per epoxide equivalent.

The epoxy resin composition of the invention may contain other additives such as solvents, diluents, pigments, fillers, fibrous materials, dyes, resins, polyolefins, plasticizers and non-volatile extenders such as coal tar pitch, asphaltic bitumen, pine oil, pine tar, oils and aromatic extracts thereof.

In order to improve the storage stability of the epoxy resin composition, organic or inorganic acid compounds can be added thereto in a substantially equivalent amount with respect to the imidazole adduct. Examples of such acids are phosphoric acid, benzoic acid, paratoluene sulfonic acid and salicylic acid.

In general, the epoxy resin composition of the invention can be prepared by mixing the epoxy resin with the adduct of the invention by gentle heating or by dissolving the components in a solvent. Suitable solvents are ketones such as acetone, methyl ethyl ketone, methyl isobutyl ketone, methyl cyclohexanone and diacetone alcohol; esters such as ethyl acetate and n-butyl acetate; glycol ethers such as ethylene glycol monomethyl ether and acetates thereof. Suitable diluents are benzene, toluene, xylene and liquid monoepoxides. The temperatures employed during cure may vary over a wide range, with preferred temperatures within the range of 50° to 250° C.

The epoxy resin compositions of the invention can be used to make composites such as laminates, castings, molded articles and coatings. The adducts of the invention are liquid at room temperature and can be used in mixing ratios which permit the use of commercial mixing equipment. The epoxy resin compositions of the invention are particularly suitable as solventless prepreg matrix systems for fiber-reinforced composites. For that purpose fibrous material such as glass filaments, mats or cloth is impregnated with the epoxy resin composition of the invention. The eventual laminate is made by shaping the fibrous material to a lay-up and curing the resulting lay-up structure at elevated temperature. Lay-ups prepared from the epoxy resin composition of the invention have excellent storage stability and reactivity.

Fiber mats or cloth impregnated with the compositions may be superimposed and the assembly, or lay-up, cured under heat and pressure at temperatures from 50° to 300° C. and pressures from 1.75 to 35 or more $kg/cm^2$.

The invention is illustrated below.

EXPERIMENTAL PROCEDURES (I) Preparation of Imidazole/Glycidyl Ester Adduct

An amount of imidazole was charged to a reactor and heated to 135° C. The temperature was increased to 140° C. with stirring. A stoichiometric amount of a glycidyl ester of an alpha,alpha branched saturated monocarboxylic acid was gradually pumped into the reaction mixture over a period of 4 hours, while keeping the reaction mixture at 140°C. A post reaction of 45 minutes at 145° C. was carried out. Then the product was cooled to 100° C. and removed from the reactor.

(II) Preparation of a Prepreg

For the determination of Kofler reactivity and the glass transition temperature (Tg), a sheet of prepreg was prepared using the following procedure:

A sheet of release paper was put on a temperature-controlled aluminum plate at 50° C. On top of the release paper, a sheet of glass cloth (100 $g/cm^2$) was clamped and allowed to warm up for at least 5 minutes. The epoxy resin composition at room temperature was poured at the top of the sheet of glass cloth and filmed with a bar coater. Then a second sheet of release paper was laid on the film and impregnation was enhanced by rolling the package with a steel handroller. The filming and impregnation procedure was carried out in 60 seconds.

(III) Screening Tests

1) Brookfield viscosity at 25° C., to determine the viscosity of the adduct.

2) Tecam gel time at 60° C. (SMS 2381-74), to assess the shelflife of the epoxy resin composition.

3) Hot Plate Gel Time (HPGT) at 150°, 160° and 170° C., the "time to no string" (ttns) is measured to evaluate reactivity of the epoxy resin composition.

4) The Kofler gel temperature after 60, 120, 240 and 480 seconds, to evaluate the reactivity of the prepreg.

The procedure for the determination of the Kofler gel temperature was as follows:

The temperature gradient of the Kofler bench was set from 250° to 35° C. Four mm wide strips with a length of 30 cm were placed on the bench. After a predetermined time of 60, 120, 240 and 480 seconds, one of the strips was removed from the bench in a ripping movement starting at the low temperature end. The gelation point was defined as the point where the force to remove the strip of prepreg suddenly increases and the matrix system is no longer left on the surface of the bench. At this point the temperature was determined using a thermocouple.

5) Glass rubber transition temperature (Tg) measured by Dynamical Mechanic Analysis (DMA) or Differential Scanning Calorometry (DSC) as indicated.

6) Reaction kinetics were determined using a Dupont 912 DSC, heating rate 10° C./min.

EXPERIMENTS

The following adducts (A and B according to the invention and C for comparison) were prepared as described in (I) above.

A) CE10/IPI: adduct of CARDURA ® E10 and 2-isopropyl imidazole

B) CE5/IPI: adduct of CARDURA ® E5 and 2-isopropyl imidazole

C) CE10/24EMI: adduct of CARDURA ® E10 and 2-ethyl-4-methyl imidazole. (CARDURA ® E5 is a glycidyl ester of an alpha,alpha-branched saturated monocarboxylic acid having a total of 5 carbon atoms.)

Table 1 shows the viscosities of the adducts A) and C). The (advantageous) lower viscosity of A) compared to C) is evident.

TABLE 1

| Viscosity data of adducts | |
|---|---|
| Compound | Brookfield Viscosity at 25° C. Pa.s |
| A) (CE10/IPI) | 70 |

TABLE 1-continued

Viscosity data of adducts

| Compound | Brookfield Viscosity at 25° C. Pa.s |
|---|---|
| C) (CE10/24EMI) | 140 |

Table 2 shows the performance of A) and C) as curing compounds in the cure of EPIKOTE ® 828. Formulation 2A has a longer shelflife and a slightly higher Tg than formulation 2C.

TABLE 2

Comparison of CE10/IPI vs CE10/24EMI incuring DGEBPA

| Components | Formulation Code | | 2A | 2C |
|---|---|---|---|---|
| EPIKOTE ® 828 | (g) | | 100 | 100 |
| CE10/IPI | (g) | | 8 | |
| CE10/24EMI | (g) | | | 8 |
| | Total | (g) | 108 | 108 |
| Properties | | | | |
| Tecam gel time at 60° C. | (min) | | 199 | 121 |
| Reaction kinetics DSC | (10° C./min) | | | |
| Total heat of reaction | (J/g) | | 367 | 416 |
| Onset temperature | (°C.) | | 119 | 116 |
| Peak temperature | (°C.) | | 132,255 | 128 |
| Glass rubber transition Temp. (Cure: 2 h/175° C.) | (Tg) | | | |
| DSC onset | (°C.) | | 129 | 125 |
| DMA E' onset | (°C.) | | 141 | 136 |

Table 3 shows the performance of A, B, and C as accelerators at equimolar level in epoxy/dicyandiamide compositions. Formulations 3A and 3B show a longer shelflife than 3C, whereas reactivity and Tg values are at a similar (high) level.

TABLE 3

Comparison of Accelerators CE10/IPI, CE5/IPI CE10/EMI in dicy-cured composition

| Components | Formulation Code | 3A | 3B | 3C |
|---|---|---|---|---|
| EPIKOTE ® 828 | (g) | 100 | 100 | 100 |
| DICYANDIAMIDE | (g) | 7.5 | 7.5 | 7.5 |
| CE10/IPI | (g) | 1.0 | | |
| CE5/IPI | (g) | | 0.76 | |
| CE10/24EMI | (g) | | | 1.00 |
| Total | (g) | 108.5 | 108.26 | 108.5 |
| Properties | | | | |
| Tecam gel time at 60° C. | | 1418 | 1294 | 1087 |
| Hot plate gel time at | | | | |
| 150° C. ttns | (s) | 278 | 307 | 240 |
| 160° C. ttns | (s) | 231 | 230 | 203 |
| 170° C. ttns | (s) | 96 | 105 | 86 |
| Reaction kinetics | (DSC 10° C./min) | | | |
| Heat of reaction | (J/g) | 430 | 434 | 441 |
| Onset temperature | (°C.) | 142 | 142 | 132 |
| Peak temperature | (°C.) | 158 | 159 | 156 |
| Glass rubber transition temp. Measured with DMA, Heating rate 5° C./min Cure: gelation at 160° C. + postcure 1 h/180° C. | (Tg) | | | |
| E' (flex store modulus) onset temperature | (°C.) | 157 | 151 | 153 |
| E" (flex loss modulus) max. temperture | (°C.) | 164 | 158 | 161 |

We claim:

1. A composition comprising an adduct of (a) a glycidyl ester of an alpha,alpha-branched saturated monocarboxylic acid containing a total of 5 to 18 carbon atoms and (b) 2-isopropyl imidazole, said adduct being the product of contacting the glycidyl ester and the 2-isopropyl imidazole at a temperature within the range of about 100° to about 150° C. for a time within the range of about 1 to about 5 hours.

2. The composition of claim 1 wherein the glycidyl ester is a mixture of glycidylesters of alpha,alpha-branched saturated monocarboxylic acids comprising glycidyl esters of alpha,alpha-branched saturated monocarboxylic acids having a total of 9, 10 and 11 carbon atoms.

* * * * *